US008484818B2

(12) United States Patent
Ritorto, Jr. et al.

(10) Patent No.: US 8,484,818 B2
(45) Date of Patent: Jul. 16, 2013

(54) USING LEVERAGE TO FACILITATE REMOVAL OF A NUT

(75) Inventors: Joseph Thomas Ritorto, Jr., Las Vegas, NV (US); Christopher Robert Lattanzio, Las Vegas, NV (US)

(73) Assignee: B & H Worldwide, LLC, Las Vegas, NV (US)

( * ) Notice: Subject to any disclaimer, the term of this patent is extended or adjusted under 35 U.S.C. 154(b) by 515 days.

(21) Appl. No.: 12/686,626

(22) Filed: Jan. 13, 2010

(65) Prior Publication Data

US 2011/0167605 A1 Jul. 14, 2011

(51) Int. Cl.
*B25B 27/10* (2006.01)

(52) U.S. Cl.
USPC .................................. 29/267; 29/270; 29/278

(58) Field of Classification Search
USPC ................... 29/267, 244, 255, 270, 278, 261, 29/268
See application file for complete search history.

(56) References Cited

U.S. PATENT DOCUMENTS

| | | | | |
|---|---|---|---|---|
| 5,456,359 | A * | 10/1995 | Horn | 206/378 |
| 6,023,827 | A * | 2/2000 | Boe | 29/243.56 |
| 6,116,588 | A * | 9/2000 | Yamane | 269/228 |
| 6,131,491 | A * | 10/2000 | Hirse | 81/99 |
| 6,237,905 | B1 * | 5/2001 | Halder et al. | 269/32 |
| 6,543,112 | B1 * | 4/2003 | Knaebel | 29/221.5 |
| 6,807,884 | B2 * | 10/2004 | Sillman | 81/462 |
| 6,932,335 | B1 * | 8/2005 | Dykstra | 269/228 |
| 2011/0167605 | A1 * | 7/2011 | Ritorto et al. | 29/426.5 |

* cited by examiner

*Primary Examiner* — Lee D Wilson

(74) *Attorney, Agent, or Firm* — Turocy & Watson, LLP; Francis L. Dunn, Jr.

(57) ABSTRACT

System(s), method(s), and device(s) that facilitate efficient removal of a nut(s) from a wheel stud or bolt are presented. A nut removal facilitator device comprises a first arm with a holder component, wherein the first arm is attached to a lever component and a second arm, which includes a force applicator component. A socket of a wrench is placed on a desired nut, with the wrench handle portion near the socket held within the holder component and an end portion of the wrench handle in contact with the force applicator component. A force can be received at the top portion of the lever component is leveraged based on the length of the lever component. The leveraged force is transferred to the force applicator component which applies the transferred force to the wrench handle to move the handle and socket in the desired direction to loosen and remove the nut.

20 Claims, 9 Drawing Sheets

100
114
118
116
106
102
110
108
104
112

USING LEVERAGE TO FACILITATE REMOVAL OF A NUT

TECHNICAL FIELD

The subject innovation generally relates to leveraging apparatus, systems, and methods, and, more particularly, using leverage to facilitate removal of a nut(s) from a wheel stud, bolt or screw.

BACKGROUND

Often, when a person is attempting to loosen and remove nuts (e.g., lug nuts) while changing a tire on a vehicle, the person will use a wrench (e.g., a lug wrench), such as a wrench provided by the vehicle manufacturer. Conventionally, such a wrench is made of metal and has an end that fits over the nut with an attached lever portion extending at an angle from the end that fits over the nut. The person can hold the lever and attempt to push the lever in a counterclockwise direction to try to loosen and remove the nut from the wheel stud, bolt or screw, or attempt to push the lever in a clockwise direction to try to tighten the nut on the wheel stud, bolt or screw. Such a conventional wrench can be difficult to use, as with many persons, the lever portion of the wrench provides insufficient leverage to allow the person to loosen and remove the nut from the wheel stud, bolt, or screw. Further, due in part to the angling of the wrench from the end that fits over the nut, the wrench often will separate or fall off the nut while the person attempts to loosen the nut, which can cause the nut to become stripped and make removal of the nut even more difficult.

It is desirable to improve the amount of leverage a person has when attempting to loosen and remove nuts from a wheel stud, bolt, or screw, as compared to using a conventional wrench alone. Further, it is desirable to facilitate providing such leverage improvement in a manner that is easily useable by a person and easily storable when not in use.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides systems, methods, and devices that can facilitate loosening and removing a nut from a wheel stud, bolt, or screw in accordance with various aspects and embodiments of the subject innovation. In an aspect, the subject innovation can comprise a first arm (e.g., holder arm) that can be formed of a desired material (e.g., metal, such as steel, aluminum, etc.) and can contain or have attached thereto a holder component (e.g., wrench holder) that can be employed to hold a handle or arm of a wrench (e.g., lug wrench) therein. In one embodiment, the holder component can be C-shaped tube (e.g., metal tube or cylinder) of a desired length wherein there can be an opening (e.g., open region of the "C") in the holder component to facilitate inserting the wrench handle into a hollow region within the holder component, although in accordance with other embodiments, the holder component can be differently shaped or formed, as, for example, the holder component can be formed as a circular tube section of a desired length with a hollow center region wherein a wrench handle can be inserted for holding by the holder component while the wrench and subject innovation are being used, or the holder component can be formed in another desired semi-circle shape (e.g., half-circle shape) of a desired length that can be placed on a wrench handle wherein the wrench handle can be held within the semi-circular region of the holder component.

In another aspect, the first arm can comprise a hinge component that can be located at the other end (e.g., top end) of the first arm that is opposite to the end (e.g., bottom end) of the first arm having the holder component. A second arm (e.g., force applicator arm) can be attached to one portion of the hinge component, wherein the second arm can be moveable while hinged, when desired. The second arm can include or have attached thereto a force applicator component on a bottom end of the second arm, wherein the second arm and force applicator component can be formed of a desired material(s) (e.g., metal, such as steel, aluminum, etc.). In still another aspect, the force applicator component can be formed in a desired shape, such as a semi-circle shape (e.g., half-circle shape), of a desired length and can be placed on a wrench handle during use wherein the wrench handle can be held within the semi-circular region of the force applicator component to facilitate applying a force to the wrench to facilitate generating a desired amount of torque to loosen and remove a nut when the wrench socket is applied to the nut (e.g., when the nut is placed inside the wrench socket). In yet another aspect, the end region of the first arm that contains or attaches to the holder component can be angled such that the holder component can be in line with or substantially in line with the force applicator component (e.g., the holder component and force applicator component can be along a same or substantially same line such that the wrench handle can be within the holder component and force applicator component).

In an aspect, the first arm and/or the second arm can be attached to a lever component (e.g., top end of the first arm and/or top end of the second arm can be attached to a bottom end of the lever component), for example, via the hinge component of the first arm, wherein the lever component can be moveable while attached to the hinge component, when desired. The lever component can be formed of a desired material(s) (e.g., metal, such as steel, aluminum, etc.), and, as desired, can be at least partially hollow or can be solid). In accordance with various embodiments, the lever component can be adjustable (e.g., extendable), where a portion of the lever component can be inserted into or pulled partially out of a hollow tubular portion of the lever component to facilitate adjusting the length of the lever component, for example, to collapse or decrease the length of the lever component (e.g., to facilitate reducing the size of the device for storage) or increase the length of the lever component (e.g., to facilitate increasing the amount of leverage that the device can supply to facilitate loosening and removing a nut from a wheel stud, bolt or screw). In an aspect, a pin or other desired component can be employed to facilitate locking the lever component in at a desired length (e.g., the lever component can have a hole in the top portion of the lever component (and/or one or more additional holes at different points of the lever component) wherein the pin can be pushed up through a desired hole in the lever component using a spring attached to the pin to facilitate locking the lever component at a desired length).

In accordance with an embodiment, the lever component can comprise and/or be attached to (e.g., welded to) a handle component that can be located at or near the bottom end of the lever component (e.g., near where the bottom end of the lever component is connected to the hinge component of the first arm). The handle component can be formed of a desired material(s) (e.g., metal, such as steel, aluminum, etc.), and can be utilized by a user to hold and carry the device and/or to provide stability when using the device, as, for example, a user can place his hand in the handle to assist in keeping the wrench socket on a desired nut while using the other hand to apply force to the lever component when using the subject innovation.

In accordance with an aspect, when using the subject innovation, a socket of a wrench (e.g., lug wrench) can be placed on a nut (e.g., lug nut) (or a lug bolt, for example, when lug bolts are used to secure a tire). The handle of the wrench can be placed within the holder component and the force applicator component can be placed on the handle of the wrench (e.g., the handle is placed within the semi-circular region of the force applicator component). A desired force can be received by the lever component at or near the top end of the lever component. For example, a user can push downward and/or in a counter-clockwise direction on a region of the lever component that is at or near the top end of the lever component, and the force applied by the user can be received by the lever component. In response to the received force, the lever component can facilitate generating a leveraged force in an amount that is based at least in part on the amount of received force and length of the leverage component. The leveraged force, or at least a portion thereof, can be transferred from or provided by the lever component to the force applicator component, for example, via the handle component, hinge component, and second arm. The force applicator component can apply the leveraged force, or at least a portion thereof, to the wrench handle to facilitate moving the wrench handle in a desired direction (e.g., counterclockwise direction) and such applied force can be transferred from the wrench handle to the wrench socket to facilitate applying a desired amount of force on the nut to loosen and remove the nut (or lug bolt).

In an aspect, the amount of force that can be generated and transferred to the wrench and thereby the nut can be based at least in part on the amount of force received by the lever component and the length of the lever component (e.g., how far the lever component has been extended). Given a specified amount of force received by the lever component at or near the top end of the lever component, the longer the length of the lever component, the more force that can be generated and transferred by the lever component to the force applicator component, and thereby to the wrench and nut. Further, the amount of force generated and transferred by the lever component to the wrench and nut (via the force applicator component) can be greater than the amount of force that would be applied to the wrench handle and nut if the specified amount of force had been applied directly to the wrench handle without using the subject innovation. For instance, given a specified force F received by the lever component, the amount of force received by the wrench handle via the force applicator component can be increased by a factor L to produce a resultant force RF (e.g., F*L=RF), which can be a leveraged force, where the factor L can be a real number that is greater than 1.

In accordance with yet another aspect, the nut removal facilitator device can be collapsed or folded to a closed position, for example, to facilitate compacting the size of the nut removal facilitator device so that it takes up less space when being stored. When the nut removal facilitator device is opened and the lever component is in an extended position, to close the nut removal facilitator device, the lever component can be collapsed, for example, by pushing in a pin or removing a pin that holds the lever component in the extended position, and the top end portion of the lever component can be pushed down on the other portion of the lever component to decrease the length of the lever component down to at or near its smallest overall length and the pin can be inserted into a hole (e.g., when a push pin is employed, the push pin can be pushed out by a spring when the desired hole on the lever component is positioned over the location of the pin; when a removable pin is employed, the pin can be inserted in the desired hole on the lever component) at that point to hold and lock the lever component in the closed position (e.g., the other portion of the lever component can be pushed inside the hollow tubular top end of the lever component); the lever component also can be folded by moving the lever component about its hinge with the first arm from the open position such that the top end of the lever component is in proximity to the holder component of the first arm; and the second arm can be moved about its hinge such that the second arm is in proximity to the first arm on the opposite side of the first arm from the lever component. To open the nut removal facilitator device, the lever component can be unfolded by moving the lever component about its hinge so that the top end of the lever component is moving away from the holder component of the first arm until the reaches a desired point (e.g., end point) wherein the lever component is not able to move any further (e.g., where the handle component associated with the lever component makes contact with the hinge component of the first arm). In an aspect, maintaining or holding the lever component in the open position can be facilitated using, for example, a magnet or other desired component, which can be located in the center of the part of the hinge component facing the bottom end of the lever component and associated handle component. As desired, the lever component can be extended by pushing in a push pin or removing a pin that is holding the lever component in the non-extended position and pulling the top end portion away from the bottom portion of the lever component and locking the lever component at the desired length by having the push pin pushed out through the desired hole in the lever component, or by inserting the pin into the corresponding holes in the top and bottom portions of the lever component, in accordance with various embodiments. The second arm can be adjusted, as desired, by moving it about its hinge so that the second arm and first arm are in desired positions to facilitate inserting a wrench handle into the holder component and force applicator component.

Typically, there can be more than one nut to be removed, such as when removing lug nuts in order to remove a tire from a vehicle. In accordance with another aspect of the subject innovation, the nut removal facilitator device can comprise a magnetic strip, a nut holder (e.g., bag or other container), or a pin with locking cap, any of which can be used to hold the nuts after they have been removed from the wheel studs, bolts, or screws, so that the risk of losing the nuts is minimized. In one embodiment, a magnetic strip can be attached to a desired area of the nut removal facilitator device, such as the first arm, and when a nut is removed, the nut can be placed on the magnetic strip, which can have sufficient magnetic force to hold the nut on the magnetic strip. In another embodiment, a nut holder, which can be a bag (e.g., cloth bag) or container (e.g., plastic or metal container), can be attached to the nut removal facilitator device and when a nut is removed from a wheel stud, bolt or screw, the nut can be placed in the nut holder to minimize the risk of losing the nut. In still another embodiment, a pin (e.g., metal pin, plastic pin) can be attached to the nut removal facilitator device, where the pin can have a length such that a desired number of nuts (e.g., five nuts) can be placed on the pin (e.g., the nut can be slid on the pin) after being removed from the wheel stud, bolt or screw and a cap (e.g., locking cap) can be attached to or fastened on the top of the pin (e.g., screwed on the pin, pushed on the pin, etc.) to hold the nuts on the pin to facilitate minimizing the risk of losing the nuts.

In an embodiment, as desired, rubber grips can be employed to facilitate holding a wrench handle in place within the holder component and/or force applicator component. For example, a rubber grip(s) can be placed within and attached to the inside surface of the holder component and/or the inside surface of the force applicator component to facilitate maintaining desired contact with (e.g., gripping) and holding of the wrench handle therein. In another embodiment, a lever grip, which can be made of a desired material (e.g., rubber, plastic, etc.), can be placed on or attached to the top end of the lever component to facilitate holding or gripping the lever component by a user. As desired, the lever grip can have indentations spaced apart such that a user's fingers can fit within the indented areas of the lever grip to facilitate comfortable and improved gripping of the lever component. In still another embodiment, the handle component can have a handle grip placed thereon or attached thereto, wherein the handle grip can be made of a desired material (e.g., rubber, plastic, etc.) to facilitate holding or gripping that region of the lever component (e.g., handle component region of the lever component) by a user.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
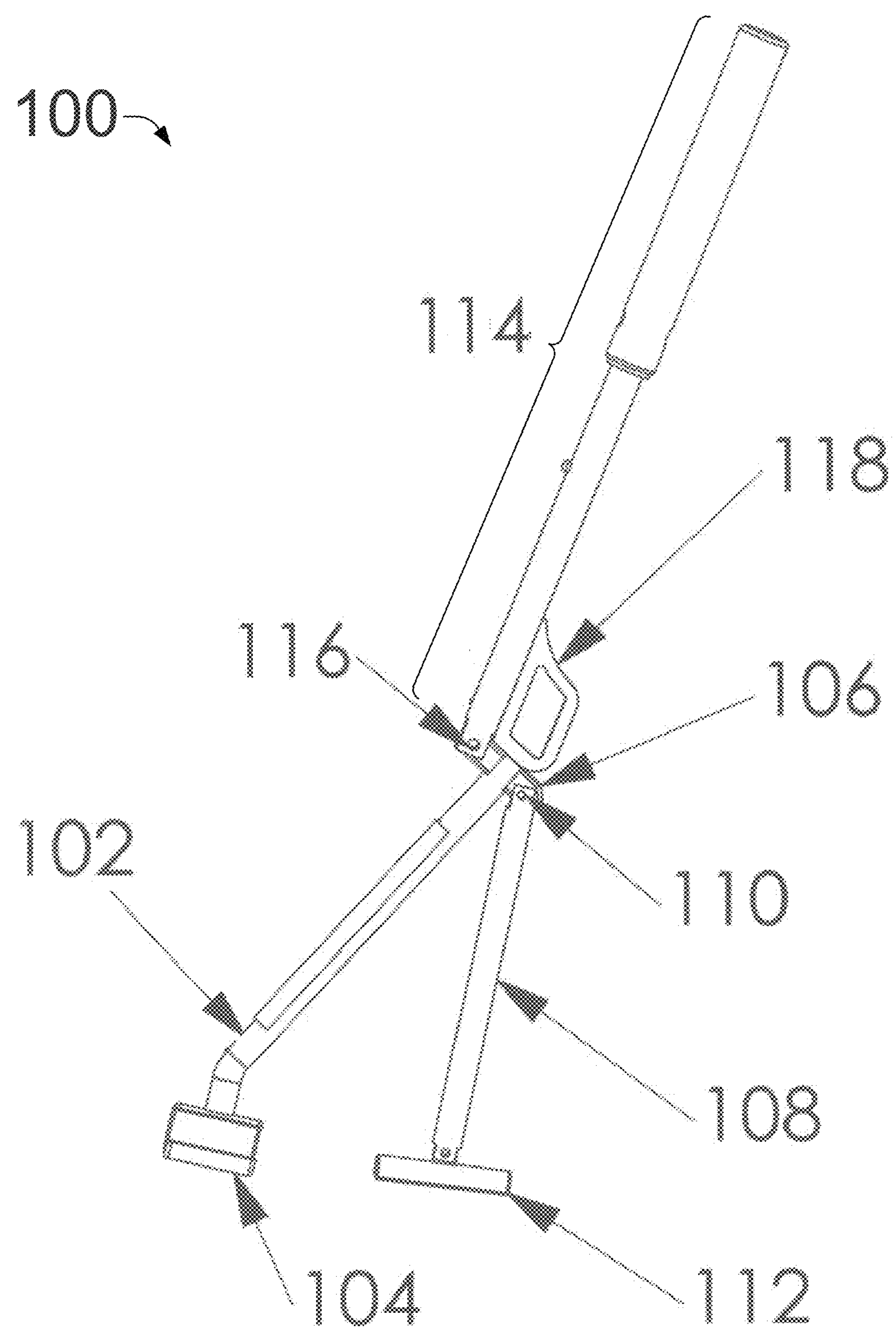
FIG. 1 is a diagram of an example nut removal facilitator device that can facilitate loosening and removing a nut from an externally threaded cylinder (e.g., a bolt, such as a wheel stud, or screw) in accordance with various embodiments and aspects of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation may be practiced without these specific details. In other instances, well-known structures and devices are shown in block diagram form in order to facilitate describing the subject innovation.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Referring to the drawings, FIG. 1 is a diagram of an example nut removal facilitator device 100 that can facilitate loosening and removing a nut (e.g., lug nut) from an externally threaded cylinder (e.g., a bolt, such as a wheel stud, or screw) in accordance with various embodiments and aspects of the disclosed subject matter. For example, the device 100 can be employed to remove lug nuts from wheel studs of a wheel, wherein each lug nut can have a hole therein, wherein the inner region of the lug not formed by the hole is threaded such that the threading corresponds to the external threading of the wheel stud, and the lug nut is fastened (e.g., secured or attached) to the wheel stud by rotating the nut in a specified direction to engage the threads of the lug nut with the threads of the wheel stud, and the lug nut is removed from the wheel stud by rotating the lug nut in the opposite direction to disengage the threads of the lug nut from the threads of the wheel stud.

Figure 2:
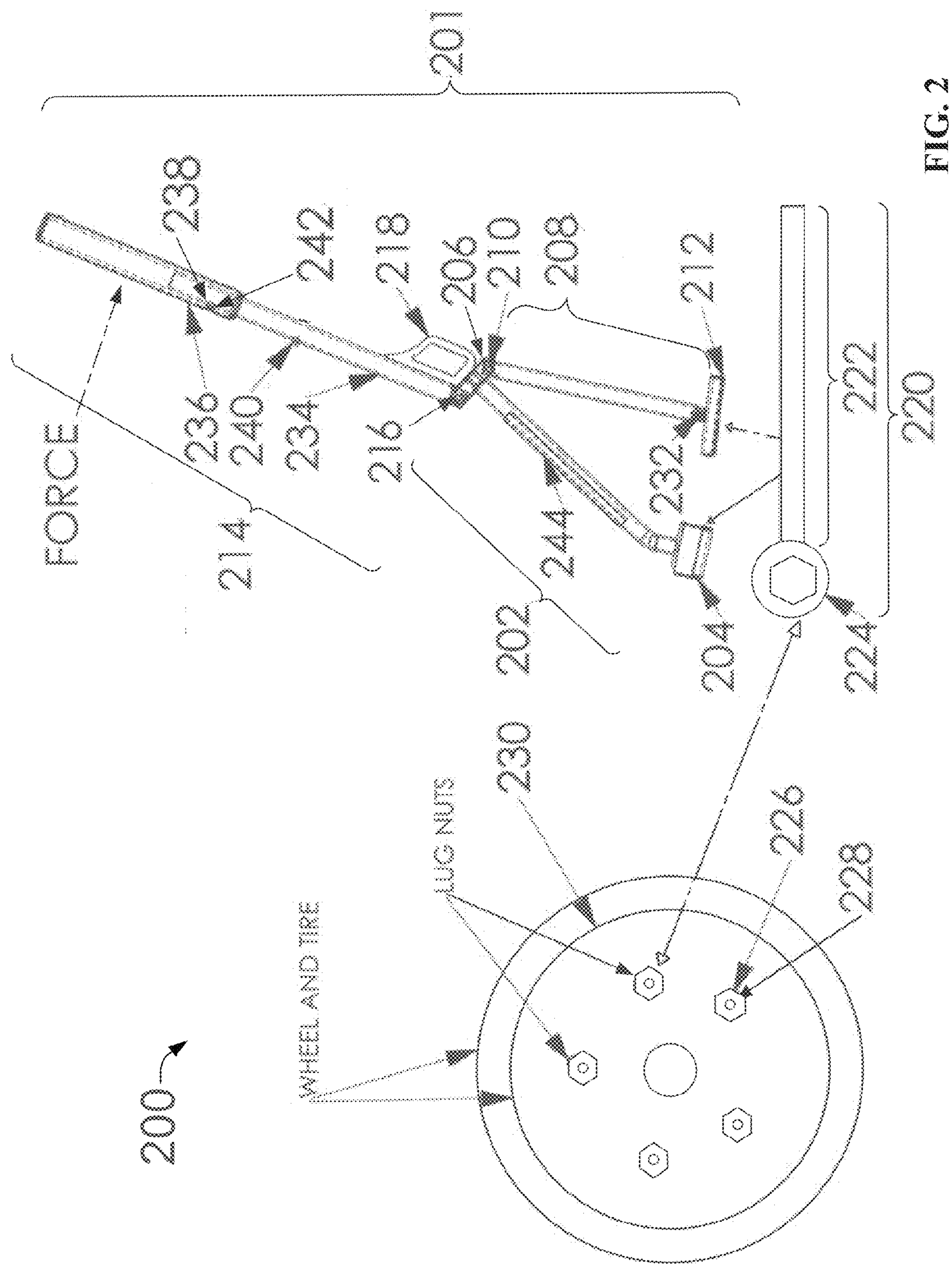
FIG. 2 is a diagram of another example system that can employ a nut removal facilitator device to facilitate loosening and removing a nut from an externally threaded cylinder in accordance with various embodiments and aspects of the disclosed subject matter.

In an aspect, the device 100 can comprise a first arm 102 (e.g., holder arm or stabilizer arm) that can be formed of a desired material (e.g., metal, such as steel, aluminum, etc.). In an aspect, a holder component 104 (e.g., wrench holder) can be formed or attached to an end (e.g., bottom end) of the first arm 102. The holder component 104 can be employed to hold a handle or arm of a wrench (e.g., lug wrench) (not shown in FIG. 1; as depicted in FIG. 2) therein. In accordance with an embodiment, the holder component 104 can be C-shaped tube (e.g., metal tube or cylinder) of a desired length wherein there can be an opening (e.g., open region of the "C") in the holder component 104 to facilitate inserting the wrench handle into a hollow region within the holder component 104 (e.g., as depicted in the cross section view of the holder component in FIG. 4 herein). It is to be appreciated and understood that, in accordance with other embodiments, the holder component 104 can be differently shaped or formed, as, for example, the holder component 104 can be formed as a circular tube section (e.g., with no "C" cutaway) of a desired length with a hollow center region wherein a wrench handle can be inserted for holding by the holder component 104 while the wrench and subject innovation are being used, or the holder component 104 can be formed in another desired semi-circle shape (e.g., half-circle shape) of a desired length that can be placed on a wrench handle wherein the wrench handle can be held within the semi-circular region of the holder component 104.

Figure 5:
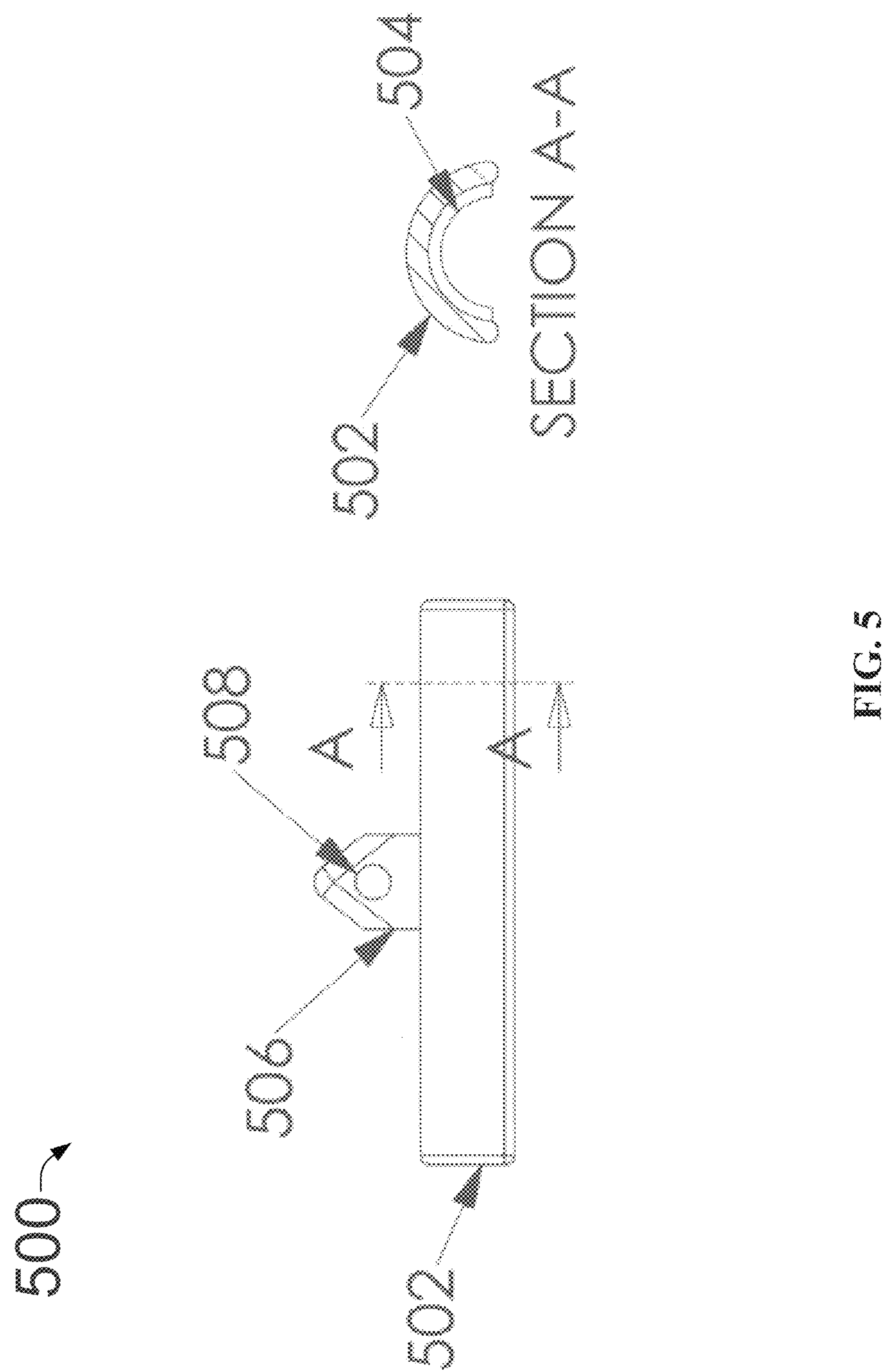
FIG. 5 illustrates a diagram of an example force applicator component in accordance with an embodiment of the disclosed subject matter.

In another aspect, the first arm 102 can comprise a hinge component 106 that can be located at the other end (e.g., top end) of the first arm 102 that is opposite to the end (e.g., bottom end) of the first arm 102 having the holder component 104. In still another aspect, a second arm 108 (e.g., force applicator arm) can be attached to one portion of the hinge component 106, wherein the second arm 108 can be held in a first hinge portion of the hinge component 106 by a fastener component 110 (e.g., pin, screw, bearing, etc., to form a hinge), and the second arm 108 can be moveable while hinged, when desired. The second arm 108 can include or have attached (e.g., via a hinge or weld) thereto a force applicator component 112 on a bottom end of the second arm 108, wherein the second arm 108 and force applicator component 112 can be respectively formed of a desired material(s) (e.g., metal, such as steel, aluminum, etc.). In still another aspect, the force applicator component 112 can be formed in a desired shape, such as a semi-circle shape (e.g., half-circle shape, such as depicted in FIG. 5 herein), of a desired length and can be placed on a wrench handle during use wherein the wrench handle can be placed and/or held within the semi-circular region of the force applicator component 112 to facilitate applying a force (e.g., leveraged force) to the handle of the wrench to facilitate loosening and removing a nut when the wrench socket is applied to the nut (e.g., when the nut is placed inside the wrench socket). In yet another aspect, the end region of the first arm 102 that contains or attaches to the holder component 104 can be angled such that the holder component 104 can be in line with (e.g., aligned with) or substantially in line with the force applicator component 112 (e.g., the holder component 104 and force applicator component 112 can be along a same or substantially same line such that the wrench handle can be simultaneously within the holder component 104 and force applicator component 112). For example, the end region of the first arm 102 can be angled to form an elbow or essentially an elbow shape at a desired distance above the holder component 104, such as is depicted in FIG. 1, where the amount of angle at the elbow portion of the first arm 102 can be based at least in part on a desired angle between the first arm 102 and second arm 108 at the hinge component 106 when the device 100 is in the open position to facilitate utilizing the device 100 to loosen and remove a nut(s).

In an aspect, the first arm 102 (as depicted in FIG. 1) and/or the second arm 108 (in accordance with another embodiment) can be attached to a lever component 114 (e.g., top end of the first arm 102 and/or top end of the second arm 108 can be attached to a bottom end of the lever component 114), for example, via the hinge component 106 using a fastener component 116 (e.g., pin, screw, bearing, etc., to form a hinge), wherein the lever component 114 can be moveable while attached to the hinge component 106, when desired. The lever component 114 can be formed of a desired material(s) (e.g., metal, such as steel, aluminum, etc.), and, as desired, can be at least partially hollow to facilitate enabling the lever component 114 to be extendable (e.g., as more fully described with regard to FIG. 2) or, in accordance with another embodiment, can be solid.

In accordance with an embodiment, the lever component 114 can comprise and/or be attached to (e.g., welded to) a handle component 118 that can be located at or near the bottom end of the lever component 114 (e.g., near where the bottom end of the lever component 114 is connected to the hinge component 106 of the first arm 102). The handle component 118 can be formed of a desired material(s) (e.g., metal, such as steel, aluminum, etc.), and can be utilized by a user to hold and carry the device 100 and/or to provide stability when using the device 100, as, for example, a user can place his hand in the handle component 118 to assist in keeping the wrench socket on a desired nut while using the other hand to apply force to the lever component 114 when using the device 100.

In accordance with an aspect, when using the device 100, a socket of a wrench (e.g., lug wrench) (not shown in FIG. 1; as depicted in FIG. 2) can be placed on a nut (e.g., lug nut) (not shown in FIG. 1; as depicted in FIG. 2). The handle of the wrench can be placed within the holder component 104 and the force applicator component 112 can be placed on the handle of the wrench (e.g., the handle is placed within the semi-circular region of the force applicator component 112). A desired force can be received by the lever component 114 at or near the top end of the lever component 114. For example, a user can push downward and/or in a desired direction (e.g., counter-clockwise direction) on a region of the lever component 114 that is at or near the top end of the lever component 114, and the force applied by the user can be received by the lever component 114. The device 100 can generate a leveraged force or resultant force based at least in part on the amount of force received by the lever component and the length of the lever component. The leveraged or resultant force, or at least a portion thereof, can be transferred from the lever component 114 to the force applicator component 112, for example, via the bottom end of the lever component 114, the handle component 118, the hinge component 106, and/or the second arm 108. The force applicator component 112 can apply the transferred force, or at least a portion thereof, received from the lever component 114 to the wrench handle to facilitate moving the wrench handle in a desired direction (e.g., counterclockwise direction) and such force can be transferred from the wrench handle to the wrench socket to facilitate applying a desired amount of force on the nut to loosen and remove the nut. The force applied by the applicator component 112 to the wrench handle (e.g., end portion of the wrench handle) can be an amount of force that is greater than the force received by the lever component 114. Further, the amount of force required to be received by the lever component 114 in order to apply a force to the wrench handle (via the force applicator component) sufficient to loosen and remove a nut from the bolt can be less than the amount of force that would have to be received by the wrench handle directly in order to loosen and remove the same nut from the bolt if the device 100 was not employed.

As disclosed, the amount of force that can be generated and transferred to the wrench by the device 100 and thereby the nut can be based at least in part on the amount of force received by the lever component 114 (e.g., from a user) and the length of the lever component 114 (e.g., how long the lever component 114 is or how far the lever component 114 has been extended, as the longer the lever component the more leverage that can be generated). Given a specified amount of force received by the lever component 114 at or near the top end of the lever component 114, the longer the length of the lever component 114, the more leverage that can be gained and thereby the more force that can be generated and transferred by the lever component 114 to the force applicator component 112, and thereby to the wrench and nut. Further, as disclosed, the amount of force generated and transferred by the lever component 114 to the wrench and nut (via the force applicator component 112) can be greater than the amount of force that would be applied to the wrench handle and nut if the specified amount of force had been applied directly to the wrench handle without using the device 100. For instance, given a specified force F received by the lever component 114 at or near the top end of the lever component 114, the amount of force received by the wrench handle via the force applicator component 112 can be increased by a factor L to produce a resultant force RF (or leveraged force) (e.g., F*L=RF), where the factor L can be a real number that is greater than 1.

The subject innovation can thereby enable a user to loosen and remove a nut from a wheel stud, bolt or screw more easily and efficiently than if the wrench alone is used or if other conventional devices are used, as, for example, the amount of force that a user has to apply to the lever component 114 in order to loosen and remove a nut from a wheel stud, bolt or screw can be less than the amount of force the user would have to apply to the wrench handle to loosen and remove that same nut from the wheel stud, bolt or screw when the device 100 is not used and less than the amount of force the user would have to apply to loosen and remove that same nut from the wheel stud, bolt or screw when using other conventional devices.

FIG. 2 depicts a diagram of an example system 200 that can employ a nut removal facilitator device to facilitate loosening and removing a nut (e.g., lug nut) from an externally threaded cylinder (e.g., a bolt, such as a wheel stud, or screw) in accordance with various embodiments and aspects of the disclosed subject matter. The system 200 can comprise a nut removal facilitator device 201, which can include a first arm 202, holder component 204, hinge component 206, second arm 208, fastener component 210 (e.g., hinge), force applicator component 212, lever component 214, fastener component 216 (e.g., hinge), and handle component 218, which each can comprise the same or similar respective functionality (or at least a portion thereof) as respectively named components, such as those more fully described herein, for example, with regard to the nut removal facilitator device 100.

In an aspect, system 200 can include a wrench 220 (e.g., a lug wrench, such as a lug wrench provided by a vehicle manufacturer or an after-market lug wrench) that can comprise a handle 222 and a socket 224, where the socket 224 can be applied to a nut 226, which is tightened down on a wheel stud 228, for example, to secure a tire 230 to a vehicle (not shown). Conventionally, a user can apply or place the socket 224 on a nut 226 and can apply a force to the handle 222 of the wrench 220 to loosen and remove the nut 226 from the wheel stud 228. Often a user has to apply great force to the handle 222 in order to loosen the nut 226 from the wheel stud 228, and sometimes, a user may not be able to loosen the nut 226 from the wheel stud 228 using the wrench, for example, due to the user not having enough strength to apply sufficient force to the handle 222 to loosen the nut 226 and/or due to the nut 226 being tightened on the wheel stud 228 by a mechanical device that applied more force in tightening the nut 226 on the wheel stud 228 than a user can generate when attempting to loosen the nut 226 and/or for other reasons (e.g., rust on the nut 226 and/or wheel stud 228).

In accordance with various aspects and embodiments, system 200 can employ the nut removal facilitator device 201 to facilitate efficiently generating increased leverage and force on the nut 226 to loosen and remove the nut 226 from the wheel stud 228. When using the nut removal facilitator device 201, the socket 224 of the wrench 220 can be placed on a desired nut 226 (e.g., lug nut) on the tire 230, wherein the inside region of the socket can be of a size and shape that corresponds to the size and shape of the nut to be removed from the bolt or screw, so that the nut can be inserted fittedly in the socket. The handle 222 of the wrench 220 can be placed within the holder component 204 via the open or cutaway section of the holder component 204 (e.g., the open part of a C-shaped holder component, wherein, for example, the C-shape of the holder component is further shown in FIG. 4) and the force applicator component 212 can be placed on the handle 222 of the wrench 220 (e.g., the handle 222 can be placed within the semi-circular region of the force applicator component 212, wherein, for example, the semi-circular shape of the force applicator component is further shown in FIG. 5). In an aspect, a desired force can be received by the lever component 214 at or near the top end of the lever component 214. For example, a user can push downward and/or in a desired direction (e.g., counter-clockwise direction, clockwise direction—depending on the threading of the wheel stud 228) on a region of the lever component 214 that is at or near the top end of the lever component 214, and the force applied by the user can be received by the lever component 214. The lever component 214 can facilitate generating a leveraged force based at least in part on the amount of the received force and the length of the lever component 214. The leveraged force (e.g., resultant force), or at least a portion thereof, can be transferred from the lever component 214 to the force applicator component 212, for example, via the bottom end of the lever component 214, the handle component 218, the hinge component 206, and/or the second arm 208. The force applicator component 212 can apply the transferred force, or at least a portion thereof, received from the lever component 214 to the wrench handle 222 to facilitate moving the wrench handle 222 in a desired direction (e.g., counterclockwise direction) and such force can be transferred from the wrench handle 222 to the wrench socket 224 to facilitate applying a desired amount of force on the nut 226 to generate the desired amount of torque to loosen and remove the nut 226 from the wheel stud 228.

In an aspect, the amount of force that can be generated and transferred to the wrench 220 by the nut removal facilitator device 201 and thereby the nut 226 can be based at least in part on the amount of force received by the lever component 214 (e.g., from a user) and the length of the lever component 214 (e.g., how long the lever component 214 is or how far the lever component 214 has been extended). Given a specified amount of force received by the lever component 214 at or near the top end of the lever component 214, the longer the length of the lever component 214, the more leverage that can be gained and thereby the more force that can be generated and transferred by the lever component 214 to the force applicator component 212, and thereby to the wrench 220 and nut 226. Further, the amount of force generated and transferred by the lever component 214 to the wrench 220 and nut 226 (via the force applicator component 212) can be greater than the amount of force that would be applied to the wrench handle 222 and nut 226 if the specified amount of force had been applied directly to the wrench handle 222 without using the nut removal facilitator device 201. For instance, given a specified force F received by the lever component 214 at or near the top end of the lever component 214, the amount of force received by the wrench handle 222 via the force applicator component 212 can be increased by a factor L to produce a resultant force RF (or leveraged force) (e.g., F*L=RF), where the factor L can be a real number that is greater than 1.

In accordance with an embodiment, the force applicator component 212 can be attached to the bottom end of the second arm via a fastener component 232 (e.g., hinge). In an aspect, a top portion (e.g., hinged portion) of the force applicator component 212 can be shaped such that the force applicator component 212 is moveable while attached by the fastener component 232 to facilitate adjusting the angle of the semi-circular portion of the force applicator component 212 so that the inside region of the semi-circular portion of the force applicator component 212 can remain flush in contact or substantially in contact with the wrench handle 222, for example, when the force applicator component 212 is applying force to the wrench handle 222.

In accordance with various embodiments, the lever component 214 can be adjustable (e.g., extendable or collapsible), where a bottom portion 234 of the lever component 214 can be inserted into or pulled partially out of a hollow tubular top portion 236 of the lever component 214 to facilitate adjusting the length of the lever component 214, for example, to collapse or decrease the length of the lever component 214 (e.g., to facilitate reducing the size of the device 201 for storage) or increase the length of the lever component 214 (e.g., to facilitate increasing the amount of leverage that the device 201 can supply to facilitate generating an increased amount of force to facilitate loosening and removing a nut 226 from a wheel stud 228 (or a screw)). In an aspect, a desired number of pins, such as pin 238 (e.g., push pin) and pin 240 (e.g., push pin), and a hole(s) 242 can be employed to facilitate locking the lever component 214 in at a desired length. For instance, when the lever component 214 is in an open or extended position, wherein the pin 238 can be pushed in or depressed through the hole 242 to unlock the top portion 236 of the lever component 214 from the bottom portion 234, and the top portion 236 can be further slid over the bottom portion 234 so that the bottom portion 234 goes further inside the top portion 236 to shorten the length of the lever component 214. When the hole 242 is positioned over the pin 240, the pin 240 can be pushed up (e.g., via a spring attached thereto (not shown)) through the hole 242 in the top portion 236 to facilitate locking the lever component 214 in the closed position. To open the lever component 214, the pin 240 can be depressed through hole 242 and the top portion 236 can be slid further off of the bottom portion 234 until the hole 242 is positioned over the pin 238, which can be pushed up (via a spring attached thereto (not shown)) through the hole 242 to lock the lever component 214 in the open position. It is to be appreciated and understood that, as desired, more pins and/or more holes can be utilized to allow for more choices (and finer adjustment) of length for the lever component 214.

Figure 3:
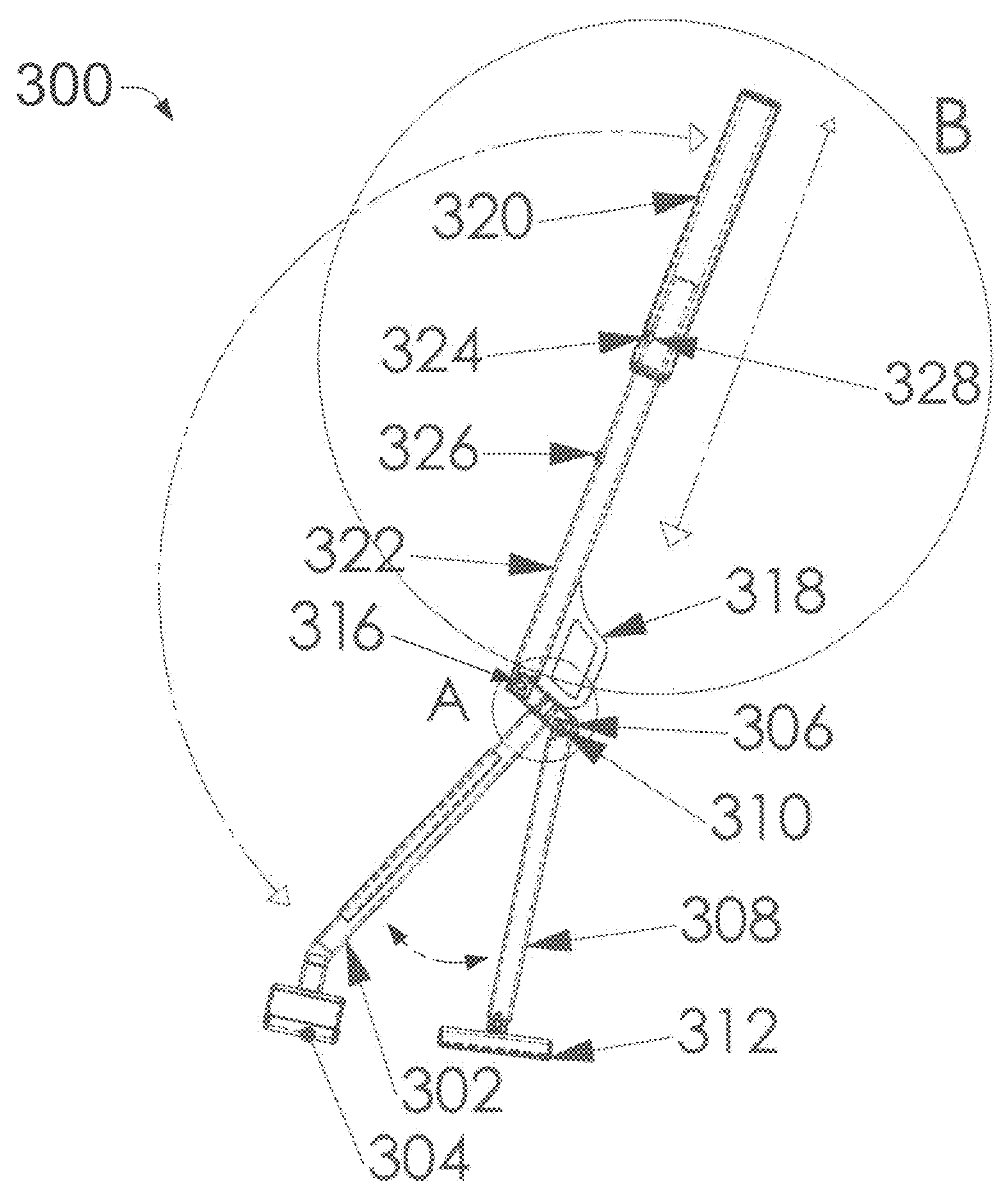
FIG. 3 illustrates a diagram of an example nut removal facilitator device that can facilitate loosening and removing a nut from an externally threaded cylinder in accordance with an embodiment of the disclosed subject matter.
Figure 3:
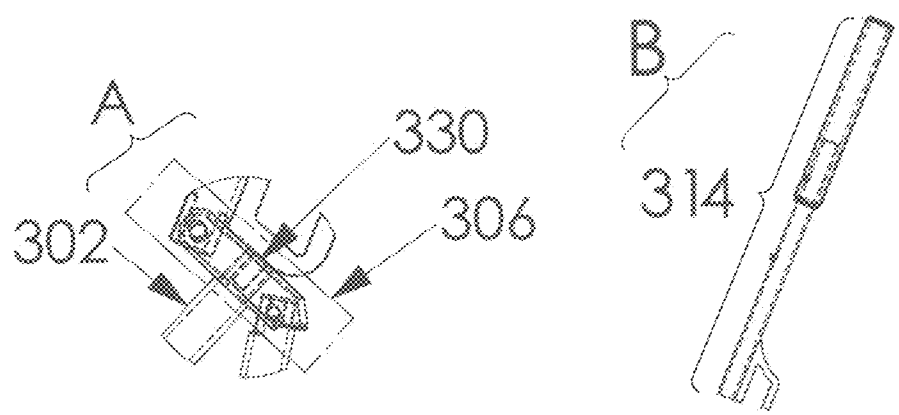

In accordance with yet another aspect, the nut removal facilitator device 201 can be collapsed or folded to a closed position, for example, to facilitate compacting the size of the nut removal facilitator device 201 so that it takes up less space when being stored. When the nut removal facilitator device 201 is opened and the lever component 214 is in an extended position, in an aspect, to close the nut removal facilitator device 201, the lever component 214 can be collapsed to a closed position, for example, as described herein. In still another aspect, to further compact the device 201, the lever component 214 also can be folded by moving the lever component 214 about its hinge (at fastener component 216) with the hinge component 206 of the first arm 202 from the open position to a point where the top portion 236 of the lever component 214 is in closer proximity to the holder component 204 of the first arm 202; and the second arm 208 can be moved about its hinge (at fastener component 210) such that the second arm 208 is in closer proximity to the first arm 202, but on the opposite side of the first arm 202 than the lever component 214. To open the nut removal facilitator device 201, the lever component 214 can be unfolded by moving the lever component 214 about its hinge (at fastener component 216) so that the top portion 236 of the lever component 214 is moving away from the holder component 204 of the first arm 202 until the lever component 214 reaches a desired point (e.g., end point) wherein the lever component 214 is not able to move any further (e.g., open or upright position, where the handle component 218 associated with the lever component 214 makes contact with the hinge component 206 of the first arm 202). In an aspect, maintaining or holding the lever component 214 in the open position can be facilitated using, for example, a magnet (not shown in FIG. 2; as depicted in FIG. 3) or other desired component, which can be located in the center of the part of the hinge component 206 facing the bottom end of the bottom portion 234 of the lever component 214 and associated handle component 218. As desired, the lever component 214 can be extended by pushing in or depressing the pin 240 (or removing a pin, in accordance with another embodiment) through the hole 242 to unlock the lever component 214 from the non-extended or closed position, and pulling the top portion 236 further off of the bottom portion 234 of the lever component 214 and locking the lever component 214 at the desired length by having the pin 238 pushed out through the hole 242 in the lever component 214 (or, in accordance with another embodiment, by inserting a pin into the aligned holes in the top and bottom portions of the lever component). The second arm 208 can be adjusted, as desired, by moving it about its hinge (at fastener component 210) so that the second arm 208 and the first arm 202 are in respective desired positions to facilitate insertion of the wrench handle 222 into the holder component 204 and force applicator component 212.

Typically, there can be more than one nut 226 to be removed, such as when removing lug nuts in order to remove a tire 230 from a vehicle. In accordance with another aspect of the subject innovation, the nut removal facilitator device 201 can comprise a magnetic strip 244, which can be used to hold the nuts 226 after they have been removed from the wheel studs 228, so that the risk of losing the nuts 226 is minimized. In one embodiment, the magnetic strip 244 can be formed of a desired material and can be flexible to fit or conform to the shape of the desired area of the nut removal facilitator device 201 to which it is attached, or can be a relatively rigid or hard material that can be formed in a suitable shape for attaching the magnetic strip 244 to a desired area of the nut removal facilitator device 201, such as the first arm 202. When a nut 226 is removed, the nut 226 can be placed on the magnetic strip 244, which can generate sufficient magnetic force to hold the nut 226 on the magnetic strip 244. It is to be appreciated and understood, that, in accordance with various other embodiments, a nut holder, which can be a bag (e.g., cloth bag) or container (e.g., plastic or metal container), can be attached to the nut removal facilitator device 201 and when a nut is removed from a wheel stud 228 (or bolt or screw), the nut 226 can be placed in the nut holder to minimize the risk of losing the nut 226; or a pin (e.g., metal pin, plastic pin) can be attached to the nut removal facilitator device 201, where the pin can have a length such that a desired number of nuts 226 (e.g., five nuts 226) can be placed on the pin (e.g., the nut 226 can be slid on the pin) after being removed from the wheel stud 228 (or bolt or screw) and a cap (e.g., locking cap) can be attached to or fastened on the top of the pin (e.g., screwed on the pin, pushed on the pin, etc.) to hold the nuts 226 on the pin to facilitate minimizing the risk of losing the nuts 226.

In an embodiment, as desired, rubber grips (not shown in FIG. 2) can be employed to facilitate holding the wrench handle 222 in place within the holder component 204 and/or force applicator component 212. For example, a rubber grip(s) can be placed within and attached to the inside surface of the holder component 204 and/or the inside surface of the force applicator component 212 to facilitate maintaining desired contact with (e.g., gripping) and holding of the wrench handle 222 therein. In another embodiment, a lever grip (not shown in FIG. 2), which can be made of a desired material (e.g., rubber, plastic, etc.), can be placed on or attached to the top portion 236 of the lever component 214 to facilitate holding or gripping of the lever component 214 by a user. As desired, the lever grip can have indentations spaced apart such that a user's fingers can fit within the indented areas of the lever grip to facilitate comfortable and improved gripping of the lever component 214. In still another embodiment, the handle component 218 can have a handle grip (not shown in FIG. 2) placed thereon or attached thereto, wherein the handle grip can be made of a desired material (e.g., rubber, plastic, etc.) to facilitate holding or gripping that region of the lever component 214 (e.g., handle component region of the lever component) by a user.

FIG. 3 depicts a diagram of an example nut removal facilitator device 300 that can facilitate loosening and removing a nut (e.g., lug nut) from an externally threaded cylinder (e.g., a bolt, such as a wheel stud, or screw) in accordance with an embodiment of the disclosed subject matter. The device 300 can comprise a first arm 302, holder component 304, hinge component 306, second arm 308, fastener component 310, force applicator component 312, lever component 314, fastener component 316, handle component 318, top portion 320 and bottom portion 322 of the lever component 314, pins 324 and 326, hole 328, and magnet 330 which each can comprise the same or similar respective functionality (or at least a portion thereof) as respectively named components, such as those more fully described herein, for example, with regard to the nut removal facilitator device 100 and system 200.

In an aspect, as desired, the nut removal facilitator device 300 can be opened for use in order to remove a nut from a wheel stud, bolt, or screw, or closed and made more compact to facilitate storage of the device 300, for example. To close the device 300, the lever component 314 can have its length reduced (when it is originally in an extended state) by pushing or depressing the pin 324 (associated with the open or extend position) into the hole 328 until the top portion 320 is unlocked and free to move, and pushing the top portion 320 of the lever component 314 down onto the bottom portion 322 of the lever component 314, wherein the bottom portion 322 can be inserted into the hollow tubular top portion 320 until the desired compact length is reached, for example, when the hole 328 in the top portion 320 has reached the other pin 326 (associated with the closed or stowed position) is pushed (e.g., via a spring (not shown)) up through the hole 328 to facilitate locking the lever component 314 in the closed or stowed position. The lever component 314 can be moved about its hinge on the hinge component 306 from an upright position by receiving a force on the lever component 314 on or substantially on the same side of the lever component 314 that contains the handle component 318, wherein in the force can be applied to the lever component 314 by a user, for example, and the force received by the lever component 314 can be an amount that is sufficient enough to overcome the magnetic force of the magnet 330 associated with the hinge component 306. The lever component 314 can be moved to a desired point, for example, such that the top portion 320 of the lever component 314 is in close proximity to the holder component 304 (e.g., lever component 314 can be moved about its hinge to a maximal amount, that is, the maximal amount that the lever component 314 can be moved away from the upright position, such that the lever component 314 is in relatively closer proximity to the holder component 304 than when it is in the upright position). As desired, the second arm 308 also can be moved about its hinge on the hinge component 306 in a direction that results in the second arm 308 being in a closer proximity (e.g., closest proximity) to the first arm 302. The device 300 can more easily be stored while in such closed position.

As desired, the device 300 can be opened, for example, so the device 300 can be utilized to remove nuts from wheel studs, bolts, or screws. In an aspect, the lever component 314 can be moved from the closed position near the holder component 304 to the upright position (e.g., when the bottom end of the lever component 314 and/or the bottom end of the associated handle component 318 are resting on the top end of the hinge component 306 and associated magnet 330), wherein the magnet 330 can produce a desired magnetic force such that it can facilitate holding the lever component 314 in the upright position. The pin 326 can be pushed or depressed until it is through the hole 328 to unlock the top portion 320 from the bottom portion 322 to enable the top portion 320 to be moved to the extended position; and the top portion 320 can be pulled upward to extend the lever component 314 until the desired extension is reached, which, for example, can be at a point where the hole 328 is over the pin 324 and the pin is pushed out through the hole 328 to lock the top portion 320 with respect to the bottom portion 322 of the lever component 314. In another aspect, the second arm 308 can be moved in a direction away from the first arm 302 to a desired point (e.g., to a point where the holder component 304 and force applicator component 312 can hold and/or be resting against a wrench handle, as desired).

Figure 4:
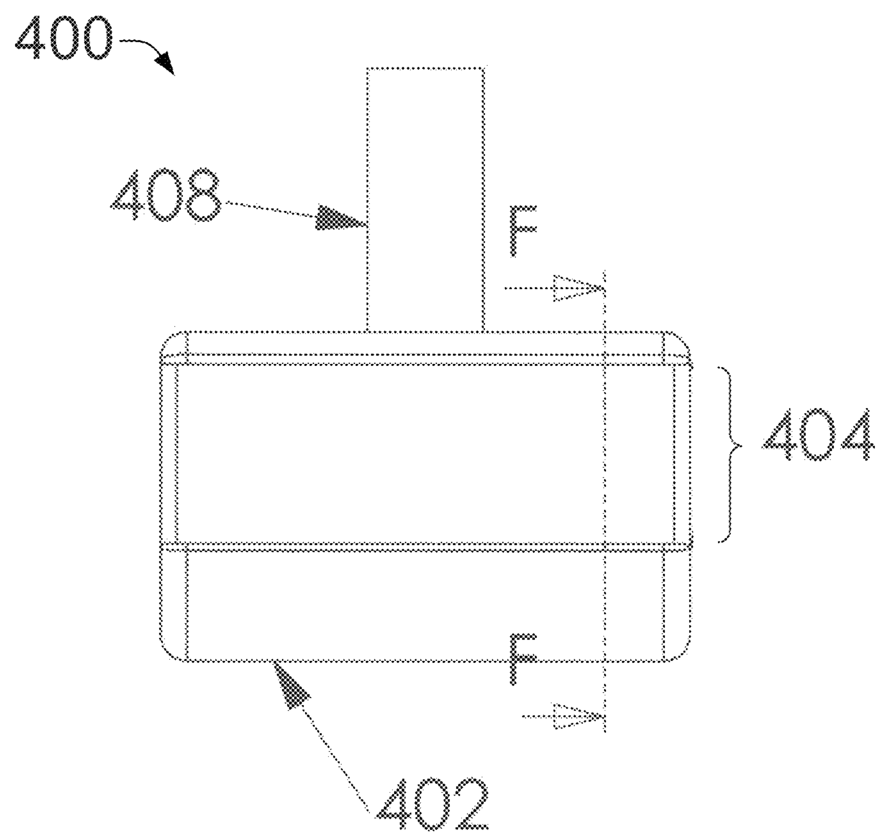
FIG. 4 depicts a diagram of an example holder component in accordance with an embodiment of the disclosed subject matter.
Figure 4:
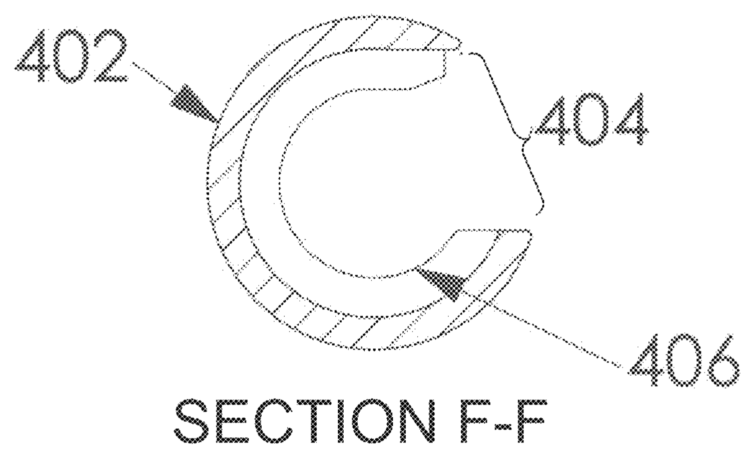

FIG. 4 depicts a diagram of an example holder component 400 in accordance with an embodiment of the disclosed subject matter. In an aspect, the holder component 400 can be associated with a nut removal facilitator device and can be utilized to facilitate holding or stabilizing a wrench (e.g., lug wrench) in a desired position (e.g., such that the wrench socket is on the desired nut) during use of the nut removal facilitator device to remove the nut from a wheel stud, bolt, or screw to which the nut is attached.

In an embodiment, the holder component 400 can a semi-tubular portion, which can be formed (e.g., constructed) of a desired material, and can comprise a C-shaped portion 402 (e.g., C-clamp or having C-clamp-like functionality) with an opening or open region 404, as depicted in FIG. 4. The C-shaped portion 402 can have a rubber grip 406 (e.g., formed of rubber or another desired polymer material) attached (e.g., glued) to the inner region of the C-shaped portion 402, wherein the rubber grip 406 can be sized to fit in a desired portion of the inner region of the C-shaped portion 402. In an aspect, the holder component 400 can be constructed such that the C-shaped portion 402, with the rubber grip of a desired thickness, is a size sufficient to fit and hold (e.g., snugly or grippedly hold) a wrench handle therein, wherein the open region 404 can be of a sufficient size such that the wrench handle can be inserted into the C-shaped portion 402 via the open region 404. The holder component 400 can be constructed such that it can withstand any forces, or at least virtually any forces, that are applied to the holder component 400 during use of the nut removal facilitator device to remove a nut from a wheel stud, bolt, or screw to which the nut is attached.

In another aspect, the holder component 400 can include a top portion 408 that can be attached (e.g., welded or formed on) to a top end of the C-shaped portion 402 near one end of the C-shaped portion 402 such that the top portion 408 is aligned or at least substantially aligned to the center of the C-shaped portion 402. The top portion 408 can facilitate attachment of the holder component 400 to a first arm of a lever component of the nut removal facilitator device, as, for example, the top end of the top portion 408 of the holder component 400 can be attached (e.g., welded) to a bottom end of the first arm.

FIG. 5 depicts a diagram of an example force applicator component 500 in accordance with an embodiment of the disclosed subject matter. In an aspect, the force applicator component 500 can be part of a nut removal facilitator device and can be utilized to facilitate applying a leveraged force to a handle of a wrench, which has a socket on a desired nut, to facilitate removal of the nut from a wheel stud, bolt, or screw to which the nut is attached.

In an aspect, the force applicator component 500 can comprise a semi-circle portion 502 that can be formed of a desired material having a desired thickness. The semi-circle region 502 also can have a desired length. The semi-circle portion 502 can have a rubber grip 504, which can have a desired thickness and can be attached to an inside region of the semi-circle portion to cover a desired portion of such inner region. The semi-circle portion 502, with the rubber grip 504, can have a size (e.g., diameter) such that the wrench handle (having a certain size) can fit within the inner region of the semi-circle portion 502.

In another aspect, the force applicator component 500 can include a top portion 506 that can be attached to a top side of the semi-circle portion 502 at or substantially at the center of the semi-circle portion 502. In an aspect, the top portion 506 can be employed as a hinge, as the top portion 506 can be shaped such that it is angled such that it comes to a centered point at its top end, and the top portion 506 can comprise a hole 508, wherein the top portion 506 can be attached to a bottom end of a portion of a second arm (not shown) of the nut removal facilitator device using a fastener component (e.g., pin, nut/bolt combination, etc.) (not shown) that can be inserted in the hole 508 and a hole on the portion of the second arm, such that the force applicator component 500 can be moveable about such hinge. This moveable aspect of the force applicator component 500 can facilitate enabling all or substantially all of the inner region of the semi-circle portion 502, with rubber grip 504, being able to remain a contact with the wrench handle during application of force to the wrench handle via the force applicator component 500. In still another aspect, the force applicator component 500 can be constructed such that the respective components can receive and withstand any force, or at least virtually any force, applied to the force applicator component 500 in relation to using the nut removal facilitator device to remove a nut from a wheel stud, bolt, or screw.

In view of the example devices and systems described herein, example methodologies that can be implemented in accordance with the disclosed subject matter can be better appreciated with reference to flowcharts in FIGS. 6-9. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification.

Figure 6:
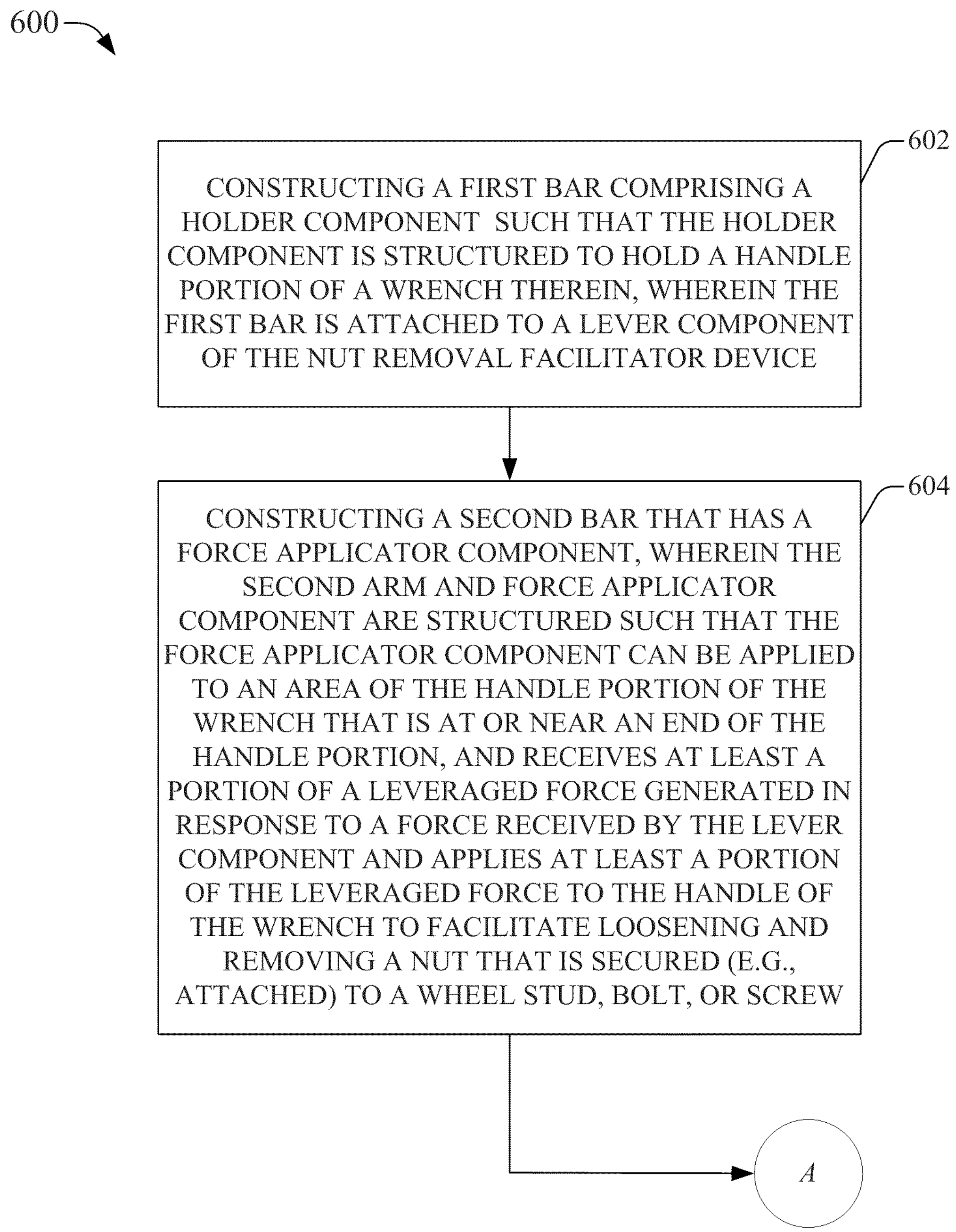
FIG. 6 illustrates a flowchart of an example methodology for constructing a nut removal facilitator device that can facilitate loosening and removing a nut from an externally threaded cylinder in accordance with an aspect of the disclosed subject matter.

FIG. 6 presents a flowchart of an example methodology 600 for constructing a nut removal facilitator device that can facilitate loosening and removing a nut from an externally threaded cylinder (e.g., a bolt, such as a wheel stud, or screw) in accordance with an aspect of the disclosed subject matter. At 602, a first bar comprising a holder component can be constructed such that the holder component is structured to hold a handle portion of a wrench therein, wherein the first bar is attached to a lever component (e.g., a bottom portion of the lever component) of the nut removal facilitator device. At 604, a second bar that has a force applicator component can be constructed, wherein the second arm and force applicator component are structured such that the force applicator component can be applied to or in contact with an area of the handle portion of the wrench that is at or near an end of the handle portion (e.g., the end of the wrench handle that is opposite from the end of the wrench having the wrench socket), wherein the second bar (e.g., top portion of the second bar) is attached to the first bar (e.g., hinge component of the first bar), and receives at least a portion of a leveraged force generated in response to a force received by the lever component and applies at least a portion of the leveraged force to the handle of the wrench to facilitate generating the desired (e.g., sufficient) amount of torque to loosen and remove a nut that is secured (e.g., attached) to a wheel stud, bolt, or screw. At this point, as desired, methodology 600 can proceed to reference point A (wherein methodology 700 can proceed from reference point A, as desired).

Figure 7:
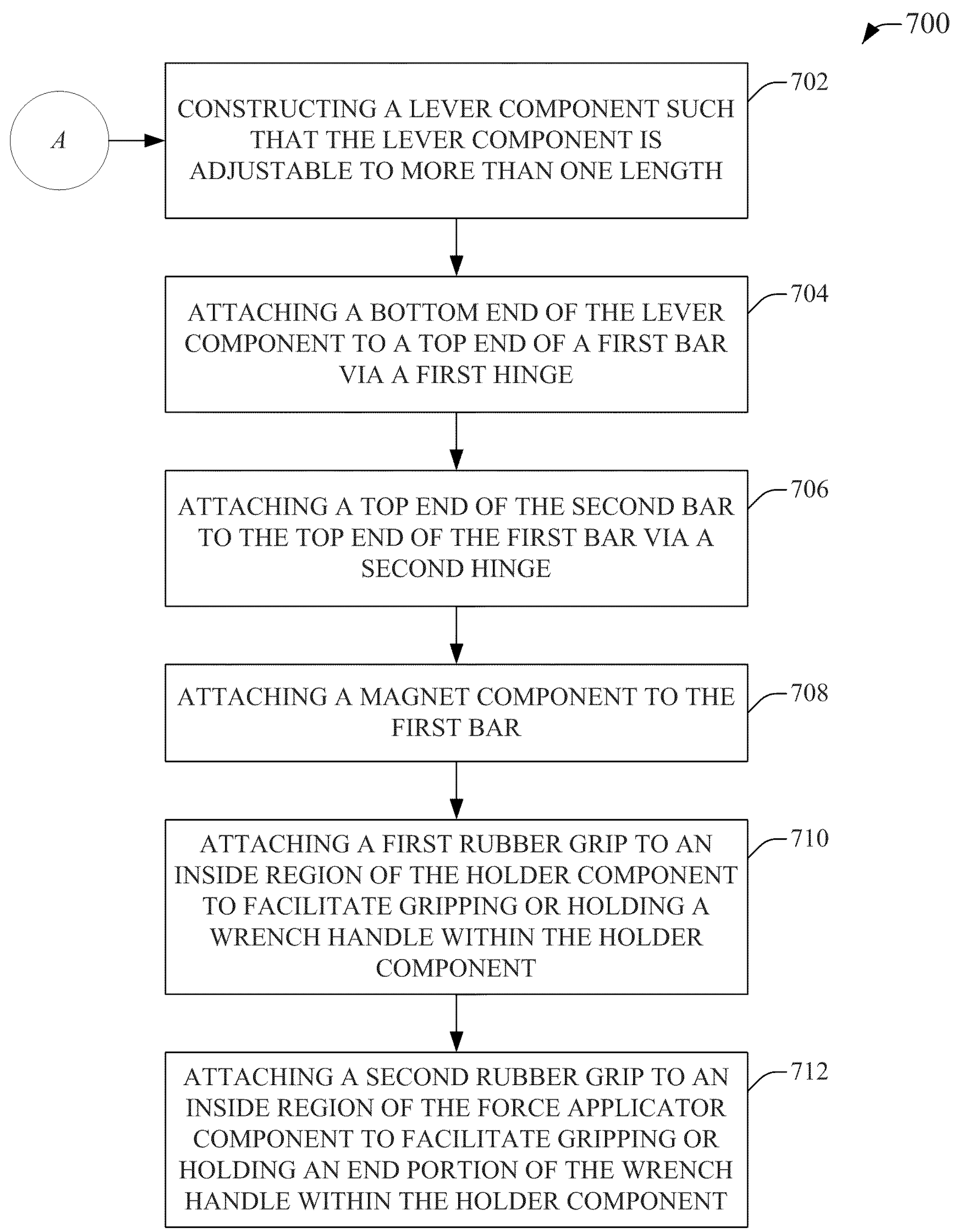
FIG. 7 depicts a flowchart of an example methodology for constructing a nut removal facilitator device that can facilitate loosening and removing a nut from an externally threaded cylinder in accordance with various aspects of the disclosed subject matter.

FIG. 7 presents a flowchart of an example methodology 700 for constructing a nut removal facilitator device that can facilitate loosening and removing a nut from an externally threaded cylinder (e.g., a bolt, such as a wheel stud, or screw) in accordance with various aspects of the disclosed subject matter. As desired, methodology 700 can proceed from reference point A to reference numeral 702, or can begin and proceed from reference point 702. At 702, the lever component can be constructed such that the lever component is adjustable to more than one length.

At 704, a bottom end of the lever component can be attached to a top end (e.g., hinge component) of the first bar via a first hinge, for example, using a fastener component (e.g., pin, nut/bolt combination, etc.). At 706, a top end of the second bar can be attached to the top end (e.g., hinge component) of the first bar via a second hinge, for example, using another fastener component. At 708, a magnet component can be attached to the first bar. In an aspect, the magnet component can be shaped so that it can fit on the first bar in accordance with the shape of the first bar, and the magnet component can be attached (e.g., glued) to the first bar.

At 710, a first rubber grip can be attached to an inside region of the holder component to facilitate gripping or holding a wrench handle within the holder component, for example, during operation of the nut removal facilitator device. In an aspect, the first rubber grip can be attached to the inside region of the holder component using a desired attaching material, such as glue that is suitable to bond a metal surface to a polymer-based surface. At 712, a second rubber grip can be attached to an inside region of the force applicator component to facilitate gripping or holding an end portion of the wrench handle within the holder component, for example, during operation of the nut removal facilitator device. In an aspect, the second rubber grip can be attached to the inside region of the force applicator component using the aforementioned desired attaching material.

Figure 8:
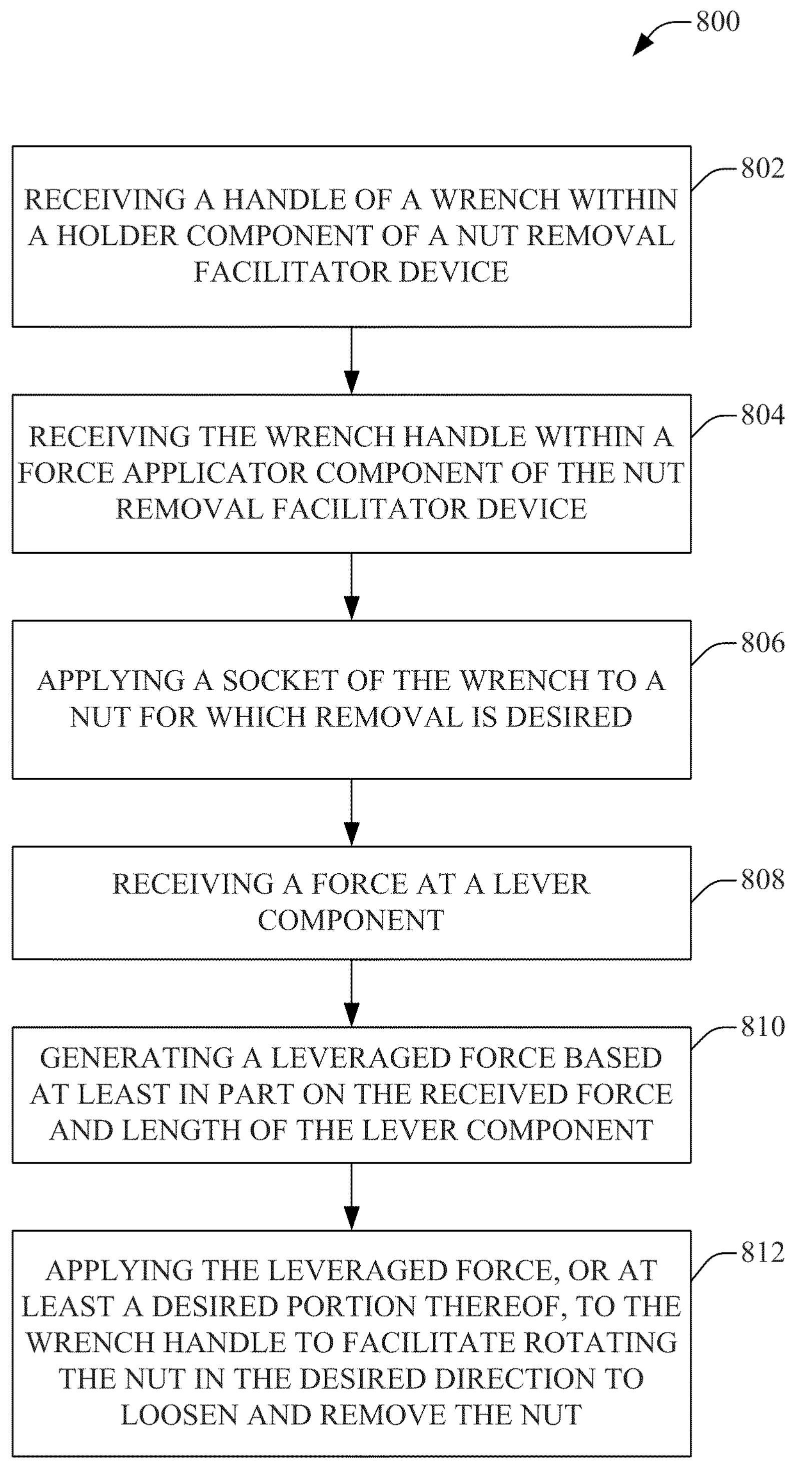
FIG. 8 illustrates a flowchart of an example methodology that can facilitate loosening and removing a nut from an externally threaded cylinder in accordance with an aspect of the disclosed subject matter.

FIG. 8 presents a flowchart of an example methodology 800 that can facilitate loosening and removing a nut from an externally threaded cylinder (e.g., a bolt, such as a wheel stud, or screw) in accordance with an aspect of the disclosed subject matter. At 802, a handle of a wrench (e.g., lug wrench) can be received within a holder component of the nut removal facilitator device. In an aspect, the wrench handle can be inserted into and received by an inner region of the holder component, for example, via an open region of the holder component (e.g., C-shaped holder component). At 804, the wrench handle can be received within a force applicator component of the nut removal facilitator device. In an aspect, the holder component can be associated with a first arm and the force applicator component can be associated with a second arm of the nut removal facilitator device, wherein the first arm can comprise a hinge component that can be employed to connect the second arm to the first arm as well as attaching a lever component to the first arm via the hinge component.

At 806, a socket of the wrench can be applied to a nut for which removal is desired. The nut can be secured or attached to a wheel stud, bolt, or screw, wherein a user can desire to remove the nut from the wheel stud, bolt, or screw (e.g., during removal of a tire from a vehicle). The wrench socket can be applied to the nut, wherein the wrench handle is secured in the holder component of the nut removal facilitator device. At 808, a force can be received by the lever component. In an aspect a force in a desired direction (e.g., downward direction, counterclockwise direction, clockwise direction—depending in part on the threading of the wheel stud, bolt, or screw) can be received by the lever component (e.g., top portion of the lever component), for example, from a user.

At 810, a leveraged force can be generated based at least in part on the received force and length of the lever component. A leveraged force, or at least a desired portion thereof, can be generated by the lever component and transferred from or provided by the lever component to the force applicator component. In an aspect, the lever component can leverage the received force so that an increased amount of force (as compared to the amount of force applied when using the wrench alone or conventional device), which can be all or at least a portion of the force generated by the lever component, can be transferred to or provided to the force applicator component. At 812, the leveraged force, or at least a desired portion thereof, can be applied to the wrench handle. For example, the force applicator component can apply the leveraged force, or at least a desired portion thereof, to the wrench handle at or near the end of the wrench handle with which the force applicator component is in contact, to facilitate rotating the nut in the desired direction (e.g., counterclockwise or clockwise—depending in part on the threading of the wheel stud, bolt, or screw) to loosen and remove the nut from the wheel stud, bolt, or screw. In response to the force applied by the force applicator component on the wrench handle, the wrench socket can generate a desired amount of torque to turn the nut in the desired direction to loosen and remove the nut from the wheel stud, bolt, or screw, as at least a portion of the applied force can be transferred to the wrench socket and nut via the wrench handle.

Figure 9:
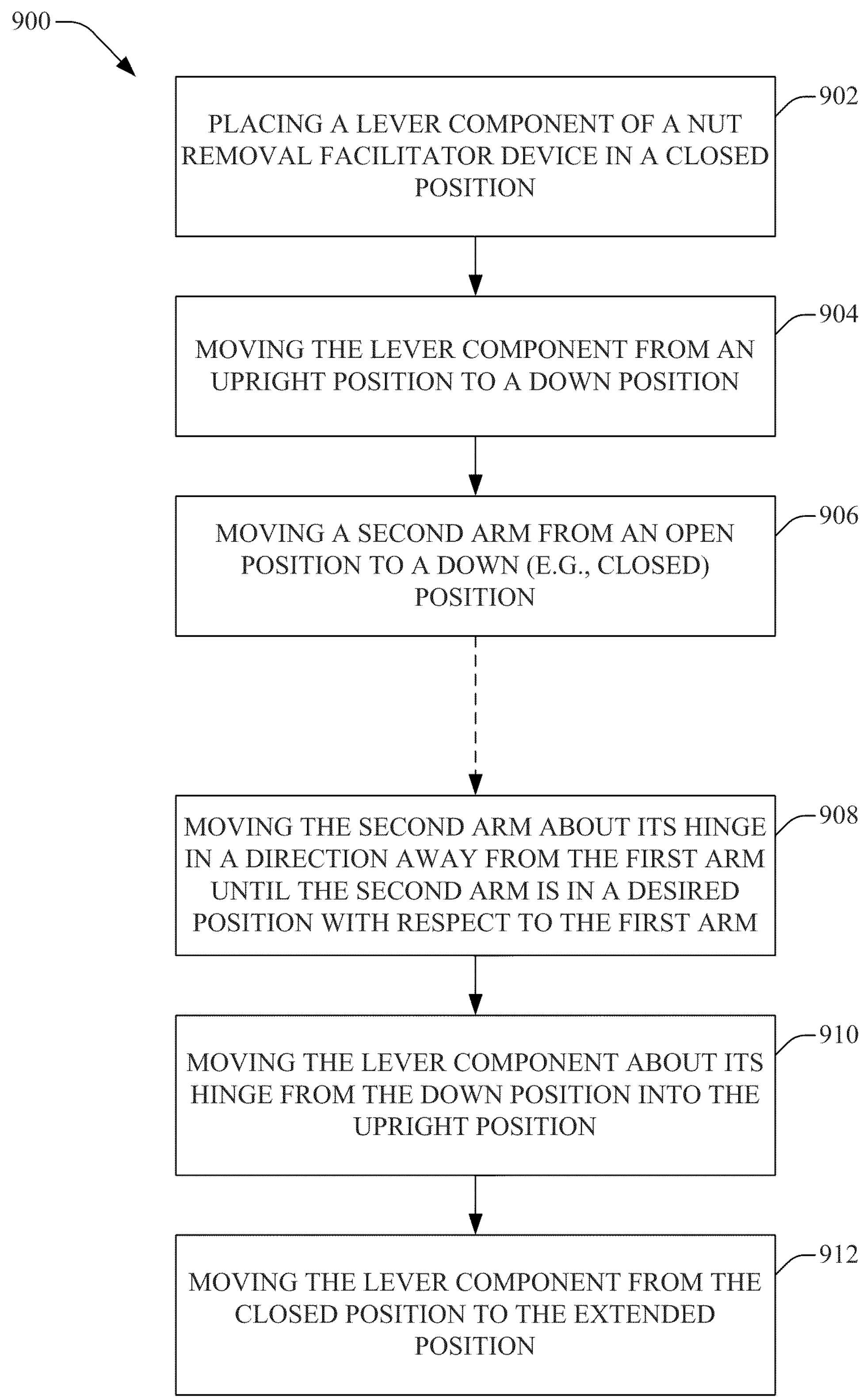
FIG. 9 illustrates a flowchart of an example methodology that can facilitate opening and closing of a nut removal facilitator device in accordance with an aspect of the disclosed subject matter.

FIG. 9 depicts a flowchart of an example methodology 900 that can facilitate opening and closing of a nut removal facilitator device in accordance with an aspect of the disclosed subject matter. The nut removal facilitator component can be in a closed position, for example, to facilitate compacting the device for storage, or an open position, for example, to facilitate operation of the device. The device initially can be in an open position, as desired. At 902, the lever component of the nut removal facilitator device can be placed in a closed position. For instance, the lever component can be collapsed from an extended position to a collapsed or closed position. In an aspect, a pin (e.g., push pin) that is on the bottom portion of the lever component can be pushed up through a hole in the top portion of the lever component when the lever component in the extended position. To facilitate collapsing the lever component, the pin can be depressed into the hole to unlock the top portion of lever component from the bottom portion, and the lever component can be moved further down on the bottom portion of the lever component until collapsed or closed, wherein another pin on the bottom portion can pop up into the hole to lock the lever component in the closed position.

At 904, the lever component can be moved from an upright position to a down position. In an aspect, the bottom portion of the lever component can be connected to a hinge component on the top of the first arm of the device, wherein the first arm can comprise the holder component that can hold a wrench. The hinge component can include a magnet on its top side that can generate a magnetic force to facilitate holding the lever component in the upright position. To facilitate moving the lever component from the upright to the down position, a force, which can be sufficient to overcome the magnet on the hinge component and move the lever component in the desired direction, can be received, for example, from a user, wherein the force can be applied to the same side of the lever component that the handle component is located. In response to the force, the lever component can be moved about its hinge such that the top portion of the lever component is in closer proximity (e.g., closest proximity) to the holder component of the first arm to place the lever component in the down position.

At 906, a second arm can be moved from an open position to a down (e.g., closed) position. In an aspect, the top end of the second arm can be attached to the hinge component. When in the open position, the second arm can be positioned with respect to the first arm such that the force applicator component of the second arm is aligned with the holder component of the first arm so that a wrench handle can be within the holder component and also within the force applicator component (e.g., the inner region of the force applicator component can be in contact with the wrench handle). To place the second arm in the down position, the second arm can be moved about its hinge in a direction towards the first arm such that the second arm is in closer proximity (e.g., closest proximity) to the first arm. At this point the nut removal facilitator device can be in the closed position.

In another aspect, the nut removal facilitator device can be placed in an open position from the down position (e.g., closed position), for example, to facilitate using the device. At 908, the second arm can be moved about its hinge in a direction away from the first arm until the second arm is in a desired position with respect to the first arm such that a wrench handle can be inserted in or received by (e.g., engaged by) the holder component of the first arm and force applicator component of the second arm.

At 910, the lever component can be moved about its hinge from the down position into the upright position. In an aspect, the lever component can be moved such that the top portion of the lever component is moving away from the holder component of the first arm and to a point where the bottom portion of the lever component and associated handle component come into contact with the top end of the hinge component of the first arm. The magnet contained in the hinge component can generate a magnetic force that can facilitate holding the lever component in the upright position once the lever component is moved into the upright position.

At 912, the lever component can be moved from the closed position to the extended position. In an aspect, the pin associated with the closed position can be depressed into the hole in the top portion of the lever component to unlock the top portion from the bottom portion of the lever component. The top portion of the lever component can be moved in relation to the bottom portion to extend the lever component and reveal more of the bottom portion of the lever component from within the top portion until the lever component is in open or extended position, wherein another pin, associated with the open position, can pop up into the hole to lock the lever component in the open position. At this point, the device can be in the open position.

It is to be appreciated and understood that components (e.g., nut removal facilitator device, first arm, holder component, hinge component, second arm, fastener components, force applicator component, lever component, handle component, pins, wrench, nut, etc.), as described with regard to a particular device, system, or methodology, can include the same or similar functionality as respective components (e.g., respectively named components) as described with regard to other devices, systems, or methodologies disclosed herein.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:

a lever component that receives a force of a first amount in a first direction at a top portion of the lever component and, in response to the receipt of the force, generates a leveraged force of a second amount in the first direction at a bottom portion of the lever component, wherein the second amount is greater than the first amount;

a first arm that is associated with the lever component;

a second arm that receives the leveraged force generated by the lever component; and a force applicator component that receives the leveraged force from the second arm to facilitate movement of the force applicator component in the first direction to apply the leveraged force in the first direction to an end region of a handle of a wrench, when the wrench is held within a holder component of the device, to facilitate movement of the wrench in the first direction to loosen a nut from an externally threaded cylinder, when the nut is within a socket of the wrench and is fastened to the externally threaded cylinder, to facilitate removal of the nut from the externally threaded cylinder.

2. The device of claim 1, further comprising:

the holder component that is located at a bottom end of a first arm of the device, wherein the holder component is cylindrically shaped with a portion cutaway to form an open region that causes the holder component to be C-shaped, wherein the open region facilitates receiving of the handle of the wrench within an inner region of the holder component.

3. The device of claim 1, further comprising:

a hinge component located at a top end of the first arm, wherein the bottom portion of the lever component is attached to the hinge component, wherein the second arm has a top end attached to the hinge component of the first arm and a bottom end attached to the force applicator component.

4. The device of claim 1, further comprising:

a magnet component that is attached to the first arm and generates a magnetic force that receives and holds the nut on a surface of the magnetic component in response to the nut being placed on the magnetic component.

5. The device of claim 3, wherein the top portion of the lever component is hollow and the bottom portion of the lever component is insertable into the top portion of the lever component to facilitate adjustment of a length of the lever component to facilitate placement of the device in a closed position.

6. The device of claim 5, wherein the lever component is moveable about a hinge of the hinge component to facilitate placement of the top portion of the lever component in closer proximity to the holder component and the second arm is moveable about another hinge of the hinge component towards the first arm to that to facilitate placement of the force applicator component in closer proximity to the holder component to facilitate placement of the device in the closed position.

7. The device of claim 1, wherein the second amount for the leveraged force is determined based at least in part on a length of the lever component and the first amount for the force, and the first direction is one of a counterclockwise direction or a clockwise direction relative to the externally threaded cylinder.

8. A system, comprising:

a holder component that is located at a bottom end of a first arm that is associated with a lever component, wherein the holder component is cylindrically shaped with a portion cutaway to form an open region, and the open region facilitates reception of a handle of a wrench therein; and a force applicator component that receives a leveraged force from a bottom portion of the lever component and applies the leveraged force to an end region of the handle of the wrench to facilitate movement of the wrench in a direction that, when a nut is within a socket of the wrench, loosens the nut that is fastened on a bolt to facilitate removal of the nut from the bolt, wherein the leveraged force is generated in response to a force received at a top portion of the lever component, wherein the force is a lesser amount of force than the leveraged force.

9. The system of claim 8, further comprising:

the lever component that receives the force and generates the leveraged force at the bottom portion of the lever component in response to the force being received at the top portion, wherein the lever component comprises a handle component that facilitates generation of the leveraged force.

10. The system of claim 8, further comprising:

the first arm that comprises a hinge component at its top end, wherein a bottom end of the bottom portion of the lever component is connected to the hinge component; and a second arm that has the force applicator component attached to its bottom end and is attached to the hinge component at its top end, wherein the second arm facilitates transfer of the leveraged force to the force applicator component.

11. The system of claim 8, further comprising:

a magnet component that is attached to the first arm and generates a magnetic force that receives and holds the nut on a surface of the magnetic component.

12. The system of claim 8, wherein an amount of leveraged force generated is a function of a length of the lever component and an amount of the force received by the lever component.

13. A method, comprising:

generating a leveraged force in a direction in response to a force received at a top end of a lever component in the direction, wherein an amount of the leverage force is based at least in part on a length of the lever component and an amount of the force received at the top end of the lever component; and applying the leveraged force to a force applicator component to move the force applicator component in the direction to facilitate having the force applicator component apply the leveraged force to an end portion of a handle of a wrench when the wrench is within a holder component associated with the lever component to facilitate rotating the nut located within a socket of the wrench in the direction to at least one of loosen or remove the nut, wherein the socket is located at an end of the wrench that is opposite from an end of the wrench that is closest to where the end portion of the handle of the wrench is located.

14. The method of claim 13, further comprising:

receiving a middle portion of the handle of the wrench in the holder component via an open region in the holder component; and holding the middle portion of the handle of the wrench in the holder component while the leveraged force is applied to the end portion of the handle of the wrench to facilitate stabilizing the wrench while the socket is on the nut.

15. The method of claim 13, further comprising:

applying the socket to the nut;

receiving the force at the top end of the lever component to facilitate generating the leveraged force; and transferring the leveraged force to the force applicator component to facilitate applying the leveraged force to the end portion of the handle of the wrench.

16. The method of claim 13, further comprising:

constructing a first bar comprising the holder component, wherein the holder component is structured to hold a middle portion of the handle of the wrench therein;

constructing a second bar comprising the force applicator component, wherein the second arm and the force applicator component are structured such that the force applicator component is placeable on the end portion of the handle of the wrench; and constructing the lever component comprising a top portion and a bottom portion, wherein the top portion is hollow and the bottom portion is sized, wherein the bottom portion fits within the top portion to facilitate controlling an overall length of the lever component.

17. The method of claim 16, further comprising:

attaching a bottom end of the bottom portion to a first hinge associated with the first bar;

attaching a top end of the second bar to a second hinge associated with the first bar; and attaching the force applicator component to a bottom end of the second bar via a third hinge.

18. The method of claim 17, further comprising:

attaching a first rubber grip to an inside region of the holder component to facilitate gripping of the middle portion of the handle of the wrench; and attaching a second rubber grip to an inside region of the force applicator component to facilitate minimizing slippage of the end portion of the handle of the wrench away from the force applicator component when the leveraged force is applied to the end portion of the handle of the wrench.

19. The method of claim 17, further comprising:

inserting at least a portion of the bottom portion of the lever component into the top portion of the lever component to facilitate collapsing the lever component to a closed position;

moving the lever component about the first hinge to bring the lever component in closer proximity to the holder component; and moving the second arm about the third hinge to bring the force applicator component associated with the second arm in closer proximity to the holder component of the first arm.

20. The method of claim 17, further comprising:

removing at least a portion of the bottom portion of the lever component from inside the top portion of the lever component to facilitate extending the lever component to an open position;

moving the lever component about the first hinge away from the holder component to bring the lever component in an upright position; and moving the second arm about the third hinge away from the holder component of the first arm to a position that facilitates holding of the wrench within the holder component while the force applicator component is in contact with the end portion of the wrench to facilitate applying the leveraged force to the end portion of the wrench.

* * * * *